(12) United States Patent
Trefz et al.

(10) Patent No.: US 8,087,481 B2
(45) Date of Patent: Jan. 3, 2012

(54) DUAL LEVER STEERING CONTROLS WITH CONTROL STOPS

(75) Inventors: Harlin J. Trefz, Jackson, TN (US); Wayne R. Hutchison, Mayville, WI (US)

(73) Assignee: Deere & Company, Moline, IL (US)

( * ) Notice: Subject to any disclaimer, the term of this patent is extended or adjusted under 35 U.S.C. 154(b) by 1161 days.

(21) Appl. No.: 11/846,660

(22) Filed: Aug. 29, 2007

(65) Prior Publication Data
US 2009/0056492 A1   Mar. 5, 2009

(51) Int. Cl.
*B62D 7/00* (2006.01)

(52) U.S. Cl. ...................... 180/6.32; 180/332

(58) Field of Classification Search .............. 180/6.32, 180/6.26, 6.34, 332, 333, 335; 74/469, 473.21
See application file for complete search history.

(56) References Cited

U.S. PATENT DOCUMENTS

| | | | |
|---|---|---|---|
| 4,505,067 A * | 3/1985 | Gillespie | 47/57.5 |
| 5,228,360 A * | 7/1993 | Johnson | 74/512 |
| 5,289,907 A * | 3/1994 | Pattock | 192/220.3 |
| 5,727,426 A * | 3/1998 | Lykken et al. | 74/526 |
| 6,161,637 A | 12/2000 | Decker et al. | |
| 6,434,917 B1 * | 8/2002 | Bartel | 56/11.3 |
| 6,708,805 B2 * | 3/2004 | Samejima et al. | 192/13 A |
| 7,458,432 B2 * | 12/2008 | Mayer et al. | 180/6.32 |
| 2004/0000130 A1 * | 1/2004 | Bartel | 56/11.3 |
| 2006/0117893 A1 * | 6/2006 | Shimizu et al. | 74/473.21 |

* cited by examiner

*Primary Examiner* — Paul N Dickson
*Assistant Examiner* — Tashiana Adams

(57) ABSTRACT

Dual lever steering controls with control stops are provided for a zero turning radius mower. Each control arm is mounted to a neutral position lever that is pivotable between a full forward drive position and a full reverse drive position. Each control stop is mounted to block the control arm and neutral position lever from pivoting to a position under a minimum forward speed. Each control stop may be biased to the minimum forward speed position, and also may be pivotable between an operating position and a non-operating position.

22 Claims, 4 Drawing Sheets

DUAL LEVER STEERING CONTROLS WITH CONTROL STOPS

FIELD OF THE INVENTION

This invention relates to grass mowing machines, and specifically to zero turning radius ("ZTR") mowers having independently powered left and right drive wheels controlled by a pair of control levers or sticks.

BACKGROUND OF THE INVENTION

Grass mowing machines known as zero turning radius ("ZTR") mowers have at least one independently powered drive wheel on each side of a frame. One drive wheel may be operated in a forward direction while the other drive wheel may be stopped or operated in reverse. Many ZTR mowers have a twin stick control system. A pair of control levers or sticks may be provided side-by-side, with each lever or stick controlling one of the drive wheels. When both levers or sticks are advanced together forwardly out of their neutral position, both drive wheels rotate forwardly to cause the mower to move forward. A ZTR mower may be steered by advancing one lever or stick more than the other.

Typically, each control lever or stick on a ZTR mower may be linked to a pump arm of one of two separate hydraulic pumps, or of a dual hydraulic pump; i.e., a separate pump for each wheel. The lever or stick may be used to move a pump swash plate through a direct linkage.

The dual lever steering controls may be mounted on a ZTR mower frame so that each has a first pivot axis allowing the lever or stick in the operating position to pivot forwardly in an arc to turn the wheel in forward, or pivot rearwardly to turn the wheel in reverse. Additionally, the operator can pivot each lever or stick to a neutral operating position, and then pivot each lever or stick outwardly in an arc to a non-operating or park position. However, if one lever or stick is pivoted forward and the other is at or near the neutral position, the ZTR mower's inner wheel has a tendency to damage the turf. During very short, small radius turns, the inside wheel that stops or turns very slowly may slide and scrape the grass where the inside wheel is positioned.

There is a need for a simple and inexpensive mechanism for dual lever steering controls on a ZTR mower that minimizes or eliminates turf damage during short, small radius turns. A need exists for a mechanism for a ZTR mower that does not slide or scrape the grass where the inside wheel is positioned during turns.

SUMMARY OF THE INVENTION

Dual lever steering controls for a zero turning radius mower include control stops that prevent the inside wheel from slowing under a minimum forward speed during a turn. Each control stop may prevent a steering control from pivoting below a minimum forward speed position. When the operator pivots the lever or stick to slow the wheel, the steering control abuts the control stop at a position that ensures the wheel continues turning forward at the minimum forward speed. As a result, turf damage is minimized or eliminated. The control stops also may allow the operator to slow the wheel under the minimum speed, stop the wheel, or turn the wheel in reverse. For example, each control stop may be biased to the minimum forward speed position, or the lever or stick may be pivoted around the control stop. Additionally, the control stops may be retracted to a non-operating position.

DESCRIPTION OF THE PREFERRED EMBODIMENT

Figure 1:
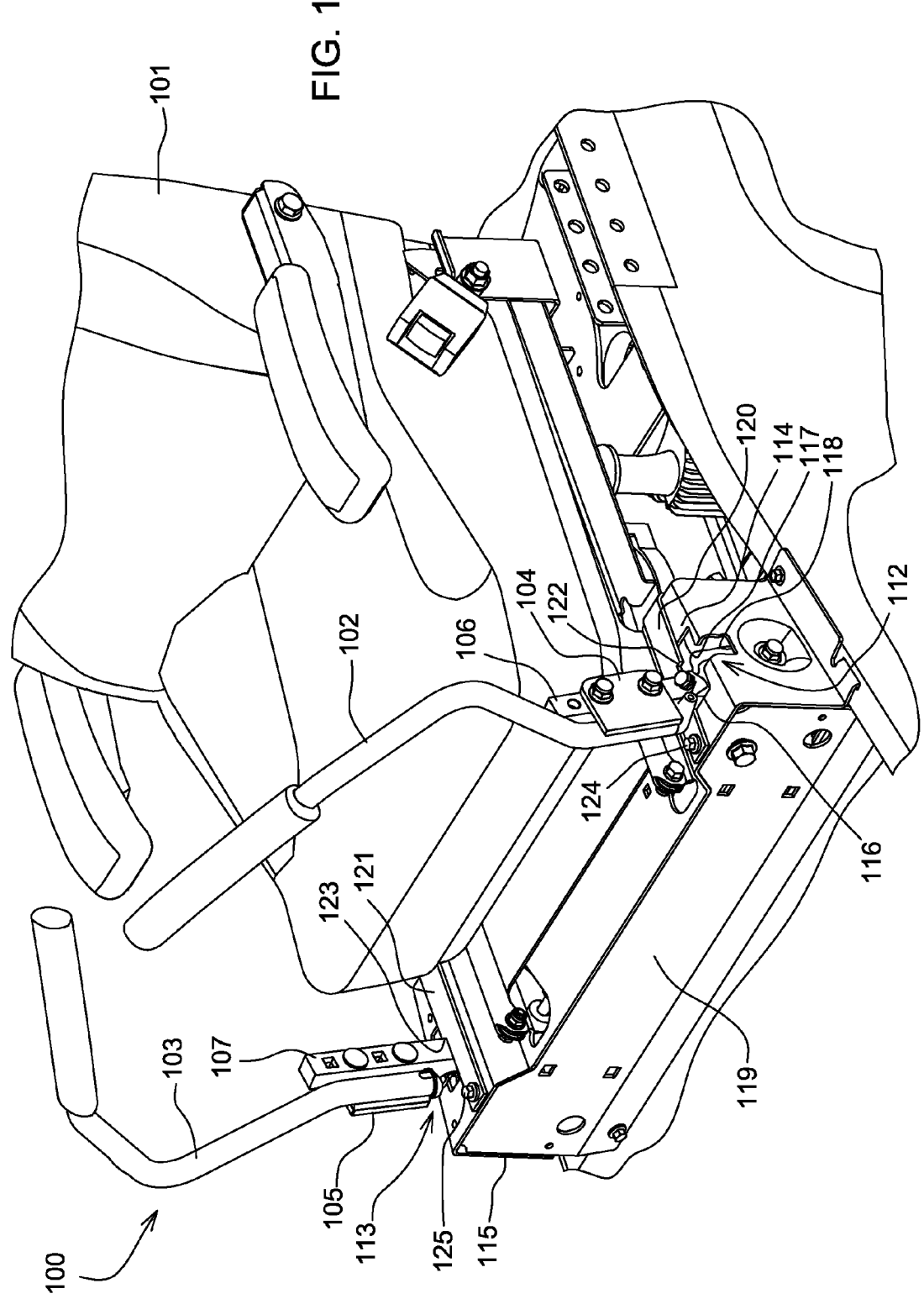
FIG. 1 is a front perspective view of dual lever steering controls with control stops according to a first embodiment of the invention, during a right turn.
Figure 2:
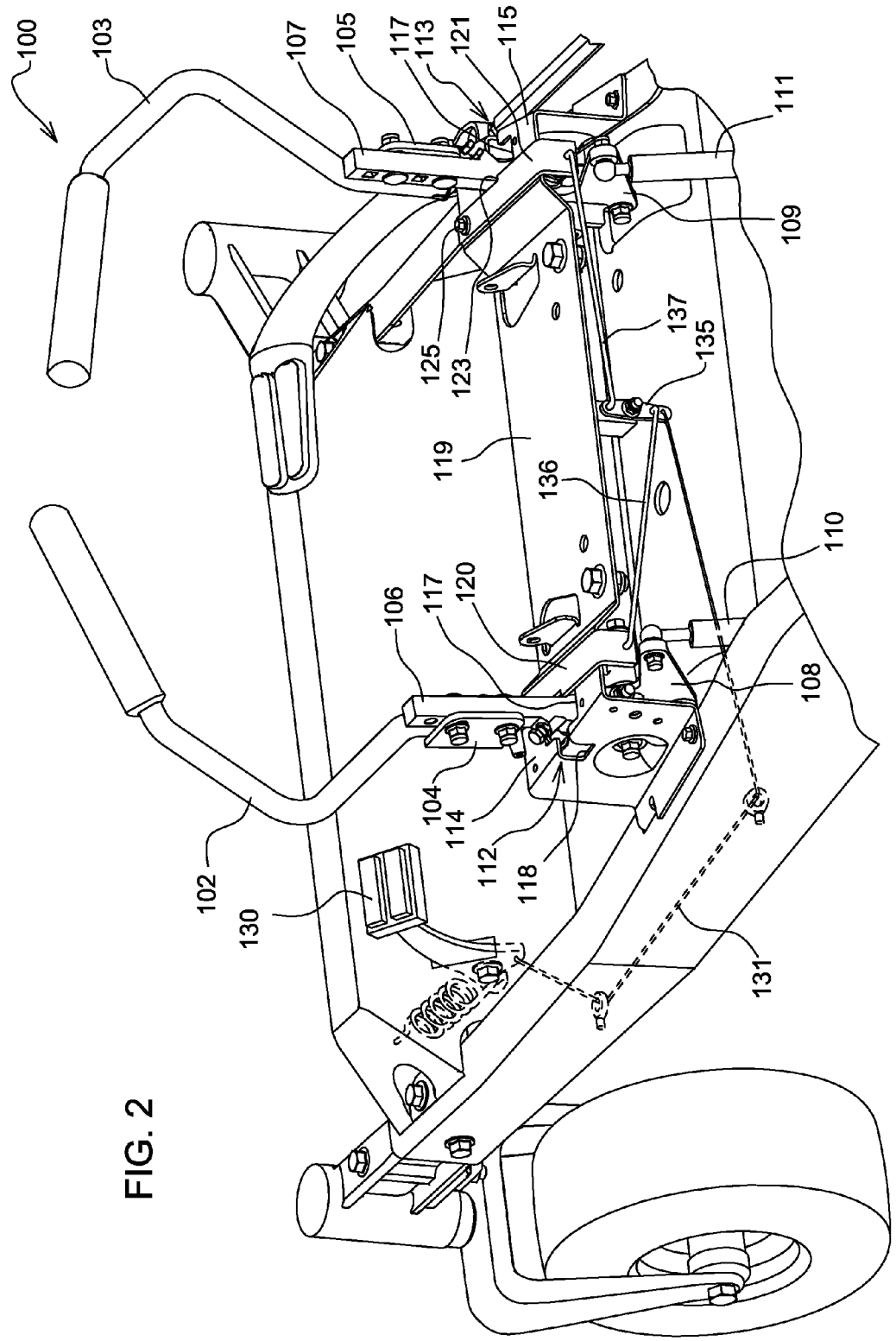
FIG. 2 is a rear perspective view of the control stops of the first embodiment, during a right turn.

Dual lever steering controls 100 with control stops 120, 121 may be used on a zero turning radius ("ZTR") mower having at least one drive wheel on each side that is independently powered to rotate independently of the other drive wheel. Each independent drive may include a separate hydrostatic drive motor coupled to each wheel. The pair of drive motors may be connected via hydraulic conduits to a dual hydrostatic pump; i.e., a separate pump for each wheel. Each side of the dual hydrostatic pump may have a swash plate that may define a pump stroke between a full reverse position and a full forward position. The ZTR mower may have a frame supported on a forward end by front wheels, and suspending a mower deck between the front and rear wheels. The ZTR mower may have a rear-mounted engine behind operator seat 101. The seat may be mounted over the frame for a seated operator to use left and right control levers or sticks 102, 103, as shown in FIGS. 1 and 2.

In one embodiment, each control lever or stick 102, 103 may be mounted to the ZTR mower so that the lever may pivot forwardly to move a swash plate in a hydrostatic pump in a first direction to cause a drive wheel to rotate forward, or pivot rearwardly to move the swash plate in a second direction to cause the drive wheel to rotate backward. Each control lever or stick may have a neutral position in which the corresponding drive wheel is at rest.

In one embodiment, the lower end of each control lever or stick 102, 103 may be fastened with bolts through bracket or plate 104, 105 to neutral position lever 106, 107. Each control lever or stick, and neutral position lever, may pivot on a first axis between a forward position, a neutral position and a reverse position. Additionally, while each control lever or stick is in the neutral position, it may pivot on a second axis perpendicular to the first axis between an inboard position and an outboard position.

In one embodiment, control pivots 108, 109 may be connected to neutral position levers 106, 107, so that each control pivot can pivot with forward and reverse pivoting of each lever. Dampers 110, 111 may be fastened to each control pivot, along with a steering linkage connecting each control pivot to a hydraulic pump.

In one embodiment, each neutral position lever 106, 107 pivots within a T-shaped slot 112, 113. The T-shaped slots are located in plates 114, 115 on the opposing sides of platform 119 on the left and right front corners below operator seat 101. Each T-shaped slot may have a forward end 116, a rearward end 117, and a laterally outward end 118 at the neutral position. Each neutral position lever can pivot between the full forward position at the forward end of the slot, and the full reverse position at the rearward end of the slot. The neutral position lever also can pivot outwardly from the neutral position located between full forward and full reverse.

In one embodiment, control stops 120, 121 are mounted on plates 114, 115 alongside the forward/reverse portion or axis of each T-shaped slot 112, 113. Each control stop 120, 121 may extend partially over the T-shaped slot, preferably extending over the slot about 5 mm to about 20 mm, between the full forward end and the full reverse end of the slot. Each control stop has a shoulder 122, 123 or detent that is positioned inside the width of the T-shaped slot, partially blocking the slot. The shoulder or detent is configured and positioned to extend sufficiently inside the width of the slot to block or resist pivotal movement of a neutral position lever 106, 107 below a minimum forward speed. By locating the shoulder or detent within the slot at a minimum forward speed position, the control stop can block or stop the inside control lever or stick from pivoting to a slower speed, or into neutral or reverse, during turns. Alternatively, instead of shoulders, each control stop may include a detent that can indicate the neutral position lever at the minimum forward speed position until the operator exerts a greater force on the control lever or stick to overcome the latching force.

Figure 3:
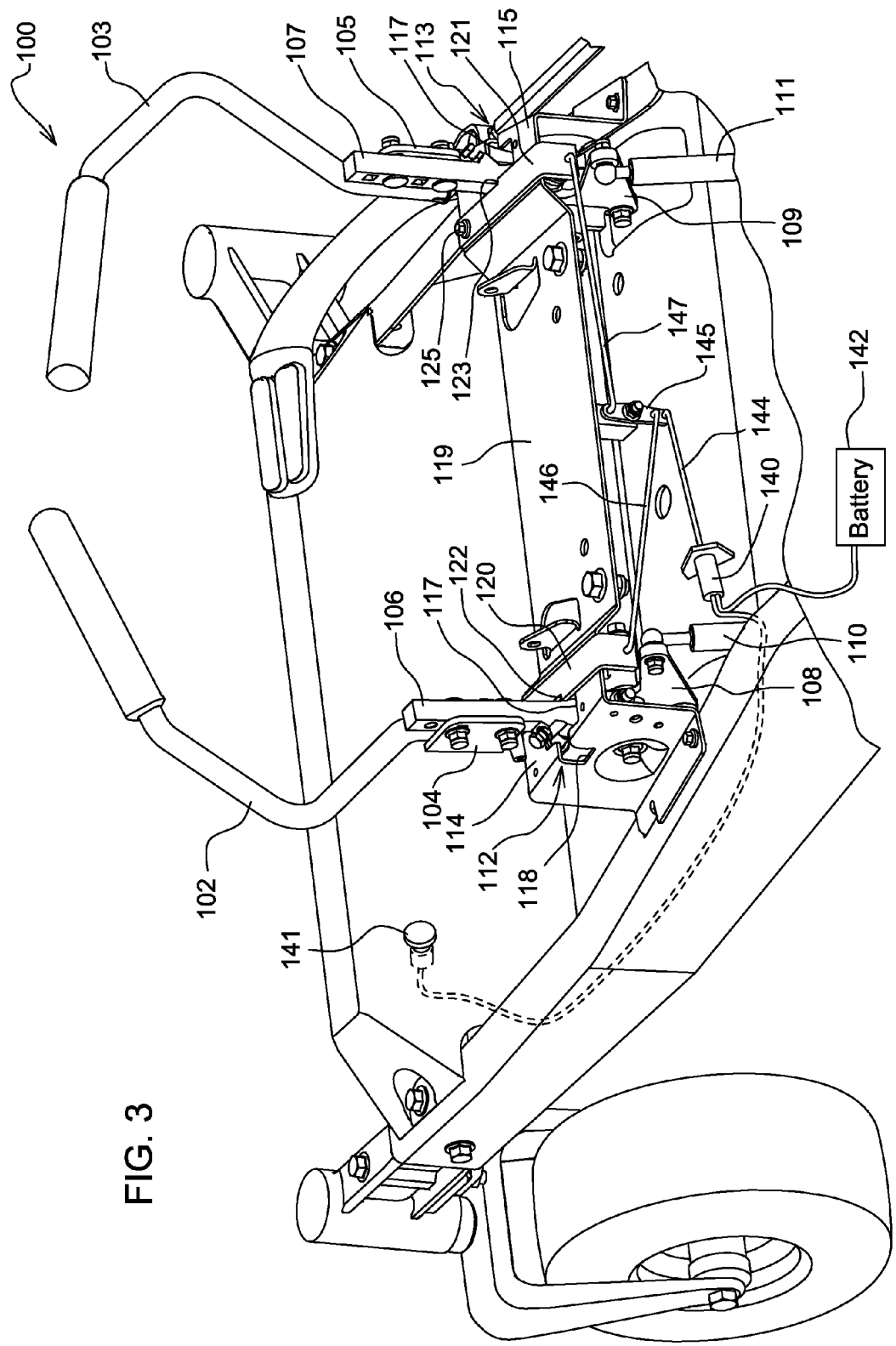
FIG. 3 is a rear perspective view of the control stops according to a second embodiment, during a right turn.

In FIGS. 1-3, dual lever steering controls 100 with control stops 120, 121 are shown during a sharp right turn. Left control lever or stick 102 may be pivoted forward so that left neutral position lever 106 moves toward the forward end 116 of left slot 112. As a result, the left drive wheel is at a forward drive position. Right control lever or stick 103 is pivoted rearwardly until right neutral position lever 107 contacts shoulder 123 or detent at the minimum forward speed position. With the left control stick at a forward position and the right control stick at minimum forward speed, the ZTR mower can negotiate a sharp right turn without damaging the turf. Thus, each control stop prevents a control lever or stick from pivoting below a minimum forward speed.

In one embodiment, each T-shaped slot 112, 113 has a greater width than each neutral position lever 106, 107 that pivots within the slot. Because the slot width is greater than the neutral position lever, each control stop may be dimensioned so that it partially blocks the slot. The operator can then move either control lever or stick past the shoulder or detent into neutral or reverse, by moving the control lever or stick outwardly sufficiently to get around the shoulder or detent. The width of the shoulder should be less than about 5 to 8 mm, so that a relatively small outward movement of the control lever or stick is required to get past the shoulder.

In FIGS. 1-3, control stops 120, 121 are shown in their operating positions. However, in one embodiment, each control stop 120, 121 may also be moved to a non-operating position where it does not set the minimum forward speed. For example, each control stop may be pivotally mounted to plates 114, 115 so that the control stop may be pivoted inwardly to a non-operating position. For example, pivot points 124, 125, in the form of threaded fasteners, may connect each control stop to one of the plates. To move each control stop from an operating to a non-operating position, it may be pivoted inwardly until it does not extend over the T-shaped slot 112, 113.

Additionally, as shown in the embodiments of FIGS. 2-3, both control stops 120, 121 may be simultaneously pivoted between their operating and non-operating positions using an actuator such as a foot pedal, or an electrical switch and solenoid. In the operating position, the control stops are in a position to indicate the minimum forward speed for the control levers or sticks. In the non-operating position, the control stops do not indicate the minimum forward speed position.

In the embodiment shown in FIG. 2, foot pedal 130 may be used to activate the control stops. The foot pedal may be biased to a position in which the control stops are in their operating positions, and may be depressed to move the control stops into their non-operating positions. Alternatively, the foot pedal may be depressed to move the control stops from the inoperative position to the operative position. The pedal may be connected to cable 131, which turns crank 135. Left and right control stop links 136, 137, which may be rods, connect crank 135 to left and right control stops 120, 121.

Alternatively, in a second embodiment shown in FIG. 3, solenoid 140 may be attached to platform 119, and may be wired to switch 141 and battery 142. When the switch is actuated, the solenoid may turn crank 145, pulling left and right control stop links 146, 147 laterally inwardly. Each control stop link is connected to a control stop which can pivot to a non-operating position.

Figure 4:
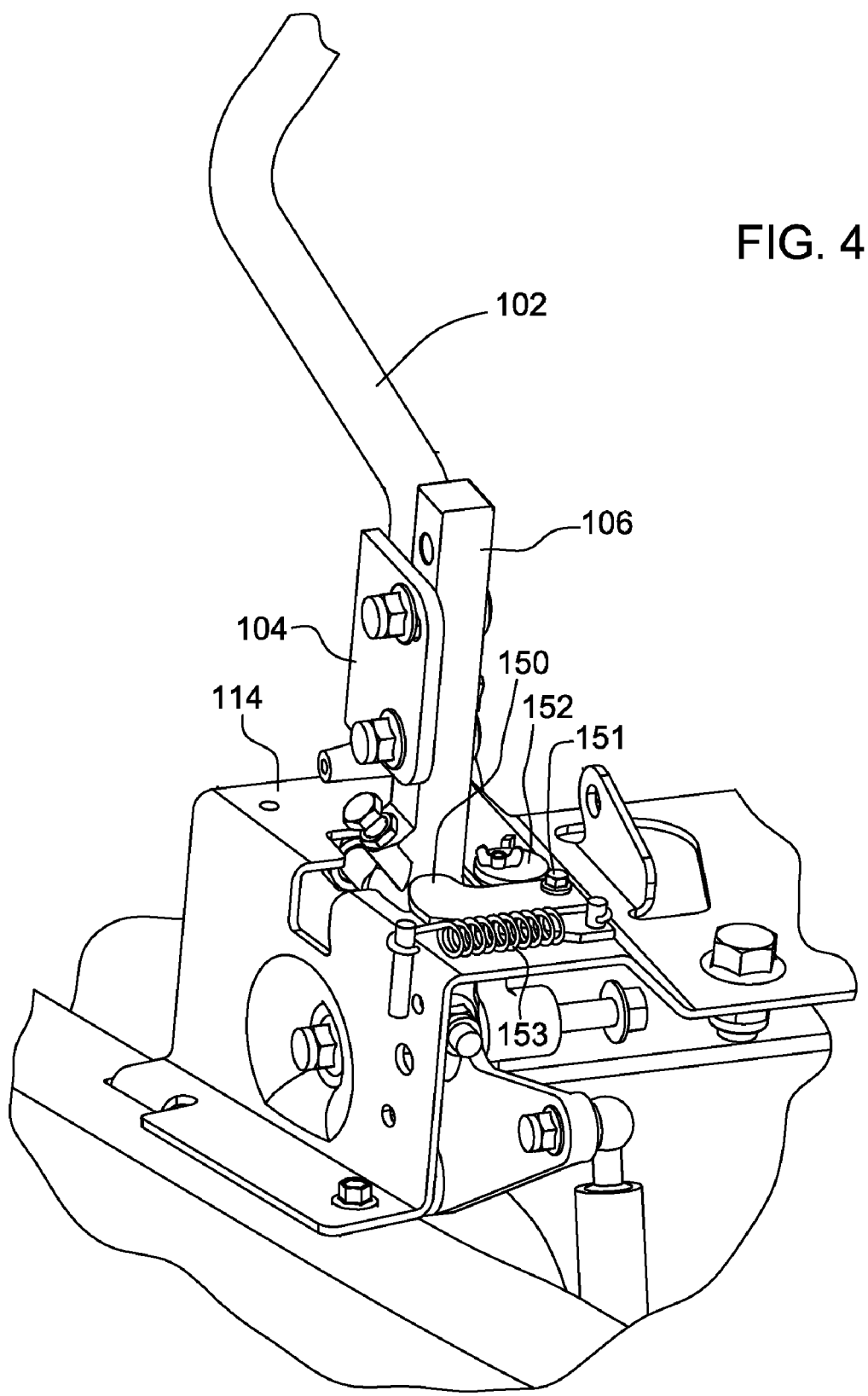
FIG. 4 is a front perspective view of a left lever on a dual lever steering control with a control stop according to a third embodiment of the invention.

In a third embodiment shown in FIG. 4, left control lever 102 is shown with control stop 150. Control stop 150 is mounted on plate 114 at the reverse end of the T-shaped slot. In the operating position, the control stop may provide a minimum forward speed. The control stop may be positioned to block or resist pivotal movement of neutral position lever 106 below a minimum forward speed. By locating the control stop at a minimum forward speed position, the control stop can block or stop the inside control lever or stick from pivoting to a slower speed, or into neutral or reverse, during turns. Additionally, the minimum forward speed position of the control stop may be set by adjustable cam 152. The adjustable cam may pivot to provide a camming surface that locates the control stop at the neutral position lever at the minimum forward speed position until the operator exerts a greater force on the control lever or stick to overcome the control stop.

In the embodiment of FIG. 4, control stop 150 may be pivotally mounted to plate 115 and biased to the minimum speed position set by adjustable cam 152. For example, pivot point 151 in the form of a threaded fastener, may connect the control stop to the plate. Spring 153 and/or damper (not shown) may urge control stop 150 against adjustable cam 152. The control stop may be pivoted rearwardly below the minimum speed position and/or into neutral or reverse, if the operator provides sufficient force on the lever or stick to overcome the spring and/or damper. The minimum speed position of each control stop, and the bias urging the control stop to that position, may be independently adjustable.

Having described the preferred embodiment, it will become apparent that various modifications can be made without departing from the scope of the invention as defined in the accompanying claims.

The invention claimed is:

1. Dual lever steering controls for a zero turning radius mower, comprising:
   a pair of control arms, each control arm mounted to a neutral position lever that is pivotable within a length of a slot between a full forward drive position and a full reverse drive position, and
   a pair of control stops, each control stop blocking a portion of a width of the slot to stop the neutral position lever from pivoting to a position under a minimum forward speed.

2. The dual lever steering controls of claim 1 wherein each control stop is biased to a minimum speed position.

3. The dual lever steering controls of claim 1 further comprising an adjustable cam holding each control stop at a minimum speed position.

4. Dual lever steering controls for a zero turning radius mower, comprising:

a pair of control arms, each control arm mounted to a neutral position lever that is pivotable within a slot between a full forward drive position and a full reverse drive position, and a pair of control stops, each control stop having a shoulder blocking a portion of the slot to stop the neutral position lever from pivoting to a position under a minimum forward speed;

wherein each control stop is pivotable between a minimum speed position and a below minimum speed position.

5. Dual lever steering controls for a zero turning radius mower, comprising:

a pair of control arms, each control arm mounted to a neutral position lever that is pivotable within a slot between a full forward drive position and a full reverse drive position, and a pair of control stops, each control stop having a shoulder blocking a portion of the slot to stop the neutral position lever from pivoting to a position under a minimum forward speed;

wherein each control stop is pivotable between an operating position and a non-operating position.

6. The dual lever steering controls of claim 5 further comprising an actuator that moves both control stops between the operating position and non-operating position.

7. The dual lever steering controls of claim 1 wherein each control stop has a shoulder to stop the neutral position lever from pivoting to a position under the minimum forward speed.

8. The dual lever steering controls of claim 1 wherein each control stop has a detent to stop the neutral position lever from pivoting to a position under the minimum forward speed.

9. The dual lever steering controls of claim 1 wherein each control lever is pivotable outwardly to move each neutral position lever around the control stop and under the minimum forward speed position.

10. Dual lever steering controls for a zero turning radius mower, comprising:

a pair of control levers pivotably mounted to the mower, each control lever controlling the transmission of rotational power to one of the drive wheels of the zero turning radius mower; each control lever pivoting between a full forward position, a full reverse position, and a neutral position between the full forward and full reverse positions; and a pair of control stops, each control stop providing a detent located at a minimum forward speed position blocking one of the control levers from pivoting to a forward position below the minimum forward speed position, or pivoting to the neutral position or a reverse position until the control lever is moved past the detent.

11. Dual lever steering controls for a zero turning radius mower, comprising:

a pair of control levers pivotably mounted to the mower, each control lever controlling the transmission of rotational power to one of the drive wheels of the zero turning radius mower; each control lever pivoting between a full forward position, a full reverse position, and a neutral position between the full forward and full reverse positions;

a pair of control stops, each control stop located at a minimum forward speed position blocking one of the control levers from pivoting to a forward position below the minimum forward speed position, or pivoting to the neutral position or a reverse position; and a spring biasing each control stop to the minimum forward speed position.

12. The dual lever steering controls of claim 10 further comprising an adjustable cam holding each control stop at the minimum forward speed position.

13. The dual lever steering controls of claim 10 wherein the control lever may be moved outwardly to allow the control lever to pivot to a forward position below the minimum forward speed, the neutral position, or a reverse position.

14. The dual lever steering controls of claim 10 wherein each control stop is pivotable between an operating position and a non-operating position.

15. The dual lever steering controls of claim 14 further comprising a pedal that moves both control stops between the operating position and non-operating position.

16. A dual lever steering controls of claim 14 further comprising a switch connected to a solenoid that moves both control stops between the operating position and non-operating position.

17. Dual lever steering controls for a zero turning radius mower, comprising:

a pair of independently pivotable control arms moveable between a full forward position, a neutral position, and a full reverse position; and a pair of control stops partially blocking each control arm from pivoting below a minimum forward position; each control stop being pivotable between the minimum forward position and at least one other position.

18. The dual lever steering controls of claim 17 wherein each control stop is biased to the minimum forward position.

19. The dual lever steering controls of claim 17 wherein the minimum forward position of each control stop is adjustable.

20. The dual lever steering controls of claim 17 wherein each control stop is moveable between an operating position and a non-operating position.

21. The dual lever steering controls of claim 20 further comprising a pedal linked to the control stops to move the control stops between the operating and non-operating positions.

22. The dual lever steering controls of claim 20 further comprising an electrical switch linked to the control stops to move the control stops between the operating and non-operating positions.

* * * * *